United States Patent
Kaikumaa

(10) Patent No.: US 9,503,654 B2
(45) Date of Patent: Nov. 22, 2016

(54) AUTOMATIC ANTI-GLARE EXPOSURES FOR IMAGING DEVICES

(71) Applicant: Intel Corporation, Santa Clara, CA (US)

(72) Inventor: Timo Kaikumaa, Nokia (FI)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/291,338

(22) Filed: May 30, 2014

(65) Prior Publication Data

US 2015/0350511 A1 Dec. 3, 2015

(51) Int. Cl.
| | |
|---|---|
| *H04N 5/222* | (2006.01) |
| *H04N 5/235* | (2006.01) |
| *G03B 13/36* | (2006.01) |
| *G03B 15/05* | (2006.01) |
| *H04N 5/225* | (2006.01) |

(52) U.S. Cl.
CPC ............ *H04N 5/2354* (2013.01); *G03B 13/36* (2013.01); *G03B 15/05* (2013.01); *H04N 5/2256* (2013.01)

(58) Field of Classification Search
USPC ........................................................ 348/187
See application file for complete search history.

(56) References Cited

U.S. PATENT DOCUMENTS

| | | | | |
|---|---|---|---|---|
| 6,035,135 | A * | 3/2000 | Okamura | ...................... 396/61 |
| 7,382,289 | B2 * | 6/2008 | McCarthy et al. | ........ 340/995.1 |
| 2003/0219245 | A1 * | 11/2003 | Cornell et al. | ................ 396/195 |
| 2006/0044422 | A1 | 3/2006 | Miyazaki | |
| 2009/0160944 | A1 * | 6/2009 | Trevelyan et al. | ........... 348/187 |
| 2010/0033588 | A1 * | 2/2010 | Thorn | ........................ 348/222.1 |
| 2010/0253797 | A1 | 10/2010 | Arshavski et al. | |
| 2012/0182451 | A1 | 7/2012 | Prabhudesai et al. | |

FOREIGN PATENT DOCUMENTS

| | | |
|---|---|---|
| JP | 2002262147 | 9/2002 |
| JP | 2006074164 | 3/2006 |
| KR | 1020100018768 | 2/2010 |
| KR | 1020100109828 | 10/2010 |

OTHER PUBLICATIONS

International Search Report and Written Opinion for International Patent Application No. PCT/US15/26440 mailed Jul. 28, 2015, 11 pages.

* cited by examiner

*Primary Examiner* — Roberto Velez
*Assistant Examiner* — Stephen Coleman
(74) *Attorney, Agent, or Firm* — Green, Howard & Mughal LLP

(57) ABSTRACT

Techniques related to anti-glare exposures for imaging devices and, in particular, for exposures that disable a flash when a flash reflecting surface is detected between the imaging device and an object of interest of the exposure are discussed. Such techniques may include determining a flash reflecting surface is between the imaging device and the object of interest based on a comparison of an autofocus distance to the object of interest and an estimated distance to the flash reflecting surface and disabling the flash based on the determination.

25 Claims, 7 Drawing Sheets

```
                    700
                     ─
        ┌─────────────────────────────────────────┐
        │ Determine an Autofocus Distance to an   │
        │           Object of Interest            │
        │                  701                    │
        └─────────────────────────────────────────┘
                          │
                          ▼
        ┌─────────────────────────────────────────┐
        │       Detect a Flash Reflecting Surface │
        │                  702                    │
        └─────────────────────────────────────────┘
                          │
                          ▼
        ┌─────────────────────────────────────────┐
        │ Estimate a Distance to the Flash        │
        │         Reflecting Surface              │
        │                  703                    │
        └─────────────────────────────────────────┘
                          │
                          ▼
        ┌─────────────────────────────────────────┐
        │ Determine the Flash Reflecting Surface  │
        │ is Between the Imaging Device and the   │
        │            Object of Interest           │
        │                  704                    │
        └─────────────────────────────────────────┘
                          │
                          ▼
        ┌─────────────────────────────────────────┐
        │        Disable Flash during Exposure    │
        │                  705                    │
        └─────────────────────────────────────────┘
```

FIG. 7

AUTOMATIC ANTI-GLARE EXPOSURES FOR IMAGING DEVICES

BACKGROUND

Obtaining images via cameras or cameras integrated within devices such as mobile phones or tablets or the like is very common. In some instances, the imaging device (e.g., the camera or device having an integrated camera) may be set in an auto mode, auto flash mode, or auto exposure mode such that the device chooses whether to fire the flash during an exposure. For example, the flash may fire when the exposure has low light conditions such that an object of interest may be brightened during exposure or such that more detail of the object of interest may be attained or the like.

In some instances, it may be desirable to attain an image of an object of interest through a pane of glass or similar surface or material. In such instances, it may be undesirable to fire the flash (even in low light conditions) as the flash may be reflected off the glass and may obscure the object of interest, provide a displeasing aesthetic in the attained image or even a substantially useless exposure. Using such existing techniques may thereby provide an undesirable resultant image.

As such, existing techniques do not provide successful image exposures in auto mode through flash reflecting surfaces such as panes of glass or the like. Such problems may become critical as the desire to quickly obtain aesthetically pleasing images in a variety of device implementations becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 7 is a flow diagram illustrating an example process for providing anti-glare exposures;

DETAILED DESCRIPTION

Figure 1:
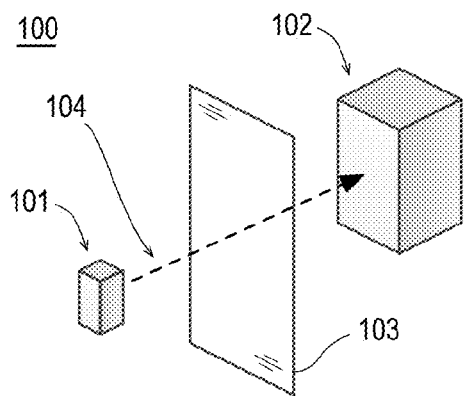
FIG. 1 is an illustrative diagram of an example exposure setting for providing anti-glare exposures for an imaging device.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, systems, and articles are described herein related to providing anti-glare exposures for imaging devices and, in particular, for disabling the flash of an imaging device when a flash reflecting surface is detected between the imaging device and an object of interest of the exposure.

As described above, obtaining images via imaging devices (e.g., cameras or cameras integrated within devices such as smartphones or the like) may be common. In some instances, the imaging device may be set to an auto exposure mode such that the device chooses whether to fire the flash during an exposure (e.g., based on low light conditions or the like) such that an object of interest may be brightened during exposure or such that more detail of the object of interest may be attained, or the like. Furthermore, in some instances, a flash reflecting surface such as a pane of glass or other similar surface or material may be between the imaging device and the object of interest (e.g., when attaining an image through a window of a house or a car or the like). In such examples, the firing of a flash during exposure may cause the flash to be reflected off the flash reflecting surface and to obscure the object of interest or other areas of the attained image. In such instances, the exposure may provide a displeasing aesthetic and potentially a useless exposure (e.g., an exposure that does not capture the object of interest and/or scene intended to be captured by a user).

In some embodiments discussed herein, providing for anti-glare exposures for imaging devices may include determining an autofocus distance to an object of interest, detecting a flash reflecting surface, estimating a distance to the flash reflecting surface, comparing the autofocus distance to the distance to the flash reflecting surface to determine whether the flash reflecting surface is between the imaging device and the object of interest, and disabling a flash of the imaging device during an exposure of the object of interest when the flash reflecting surface is between the imaging device and the object of interest. For example, detecting the flash reflecting surface may include providing a pre-exposure flash and detecting a reflection of the pre-exposure flash. The size of the detected reflection may be evaluated to determine an estimate of a distance to the flash reflecting surface. If the difference between the autofocus distance (e.g. the distance to the object of interest) and the distance to the flash reflecting surface is greater than a threshold, it may be determined the flash reflecting surface is between the object of interest and the imaging device and the flash may be disabled. For example, the imaging device may be in an auto exposure or auto flash mode and the disabling of the flash may be performed without user intervention to attain an image without undesirable glare from the flash reflecting surface.

In some examples, the detection of the flash reflecting surface may be based on a other factors (e.g., factors separate from the flash and camera system). For example, an environmental indicator may be determined for the imaging device. The environmental indicator may be generated based on an aural evaluation of an environment around the imaging device (e.g., the local aural environment may indicate the imaging device is adjacent to a flash reflecting surface, within an automobile, inside a contained area, or the like), based on a communications link to a second device (e.g., a communications link to an automobile Bluetooth may indicate the imaging device is within an automobile), based on an augmented reality evaluation of an environment around the imaging device (e.g., images from an always on camera may indicate the location of the imaging device and associated flash reflecting surface), or based on a mapping functionally of the imaging device (e.g., motion of the imaging device from a mapping functionality may indicate the imaging device is in an automobile, a global positioning system location associated with a mapping application may indicate the imaging device is within a building, or the like). In some examples, a distance to the flash reflecting surface may be estimated based on the environmental indicator. The distance to the flash reflecting surface may be compared to the autofocus distance as discussed and, if the difference between the autofocus distance and the flash reflecting surface is greater than a threshold, the flash may be disabled during exposure.

Using such techniques, the attained image may be captured without undesirable glare. In some examples, exposure settings (e.g., shutter speed/exposure capture duration and/or film speed/digital camera ISO or the like) may be adjusted based on the flash being disabled. In some examples, the disabling of the flash may have some negative impact on the exposure (e.g., more image noise or blur); however, the attained image will have the advantage of excluding the discussed glare, which may have completely obscured the object of interest and/or portions of a scene if the discussed flash was not disabled.

FIG. 1 is an illustrative diagram of an example exposure setting 100 for providing anti-glare exposures for an imaging device 101, arranged in accordance with at least some implementations of the present disclosure. As shown in FIG. 1, exposure setting 100 may include imaging device 101 attaining an image of an object of interest 102 in a direction 104 through a flash reflecting surface 103. Imaging device 101 may include any suitable imaging device having a flash capability. For example, imaging device 101 may be a camera, a smartphone, an ultrabook, a laptop, a tablet, or the like. In some examples, imaging device 101 may be in an auto-exposure mode such that imaging device 101 determines whether a flash is to fire during an exposure.

Figure 2:
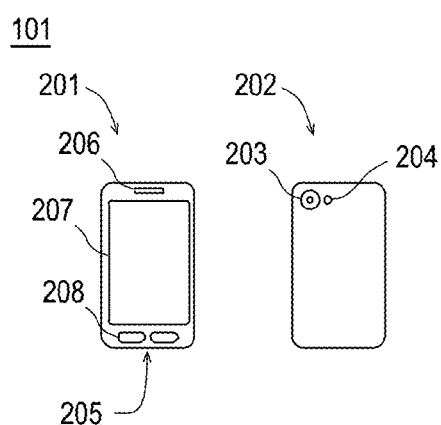
FIG. 2 illustrates an example imaging device.

FIG. 2 illustrates example imaging device 101, arranged in accordance with at least some implementations of the present disclosure. As shown in FIG. 2, in an embodiment, imaging device 101 is a smartphone. As shown, imaging device 101 may include a front 201 and a back 202. In some examples, as shown, the back 202 of imaging device 101 may include an integrated camera 203 (e.g., including a lens, an aperture, and an imaging sensor) and a flash 204 (e.g., a flash or flash light). In an example, flash 204 is a supercapacitor LED based flash. Also as shown, the front 201 of imaging device 101 may include a speaker 206, a display 207, and one or more buttons 208. Furthermore, imaging device 101 may include a microphone 205, which in the illustrated example is shown on the bottom of imaging device 101.

The described components of imaging device 101 may be incorporated in any suitable manner. For example, camera 203 and flash 204 may be incorporated on the front 201 of imaging device 101. In some examples, both a front and back camera and flash may be incorporated into imaging device 101. Furthermore, in some examples, display 207 may be a touch screen display such that a user may interact with imaging device 101 via commands initiated via display 207. In some examples, microphone 205 may be incorporated on the front 201 or the back 202 of imaging device 101. As discussed, in some examples, imaging device 101 may include each of the described components. In other examples, imaging device 101 may not include one or more of the described components. For example, imaging device 101 may not include speaker 206, display 207, and/or microphone 205. Furthermore, the discussed components may incorporated into any form factor device such as the illustrated smartphone, a dedicated camera (e.g., point and shoot camera or interchangeable lens system camera or the like) an ultrabook, a laptop, a tablet, or any other device discussed herein.

Returning to FIG. 1, object of interest 102 may include any suitable subject for imaging such as a person, an animal, or a scene or the like. Flash reflecting surface 103 may include any object or surface through which an image of object of interest 102 and any related scene may be attained via imaging device 101 that may also reflect a flash fired from imaging device 101. For example, flash reflecting surface may be a pane of glass such as a window of a home or business, a windshield or other window of an automobile, or the like.

As shown, imaging device 101 may attain an image of object of interest 102 in direction 104 through flash reflecting surface 103. In some examples, imaging device 101 may determine an autofocus distance from imaging device 101 to object of interest 102 in direction 104. The autofocus distance may be attained in any suitable manner. In some examples, determining the autofocus distance may be based on imaging device 101 having information on the position of the lens of imaging device 101 (e.g., the lens of camera 203), having information on the lens stack (e.g., the elements of the lens, the positions of the elements, and the like), and analyzing the sharpness of an image associated with object of interest 102. For example, the autofocus distance may be determined as a focal distance associated with a maximum sharpness of an image or a region within an image. In some examples, imaging device 101, during autofocus, may attain images or frames at a certain frame rate (e.g., 30 frames per second) and those attained images may be analyzed to determine an autofocus distance. In an embodiment, determining the autofocus distances is based on contrast detection autofocus. In other examples, determining autofocus may be based on phase detection techniques or other techniques. The determined autofocus distance may provide an estimation of the distance to object of interest 102. For example, the autofocus distance may be 10 cm, 30 cm, or 3 or more meters or the like (e.g., as the autofocus distance increases, the accuracy of imaging device 101 may decrease). As used herein, the term autofocus distance may include an estimated distance or an estimated distance range or the like.

In some examples, imaging device 101 may utilize an assist light to obtain the discussed autofocus. In such examples, imaging device 101 may adjust the intensity of the assist light based on the presence of flash reflecting surface 103. For example, if flash reflecting surface 103 is detected (e.g., using techniques discussed herein), imaging device 101 may reduce the intensity of the assist light such that the assist light does not over-burn or saturate the attained image such that an autofocus distance may not be attained. Furthermore, the discussed techniques associated with determining an autofocus distance and detecting flash reflecting surface 103 may be performed in any order or they may be repeated as needed prior to imaging device 101 attaining an exposure of object of interest 102 and any surrounding scene. In some examples, the discussed assist light may be implemented via flash 204 (please refer to FIG. 2).

Continuing with FIG. 1, imaging device 101 may detect flash reflecting surface 103 between itself and object of interest 102. The detection of flash reflecting surface 103 may be performed using any suitable technique or techniques. In some examples, flash reflecting surface 103 may be detected by providing a pre-exposure flash and detecting a glare or saturation based on the pre-exposure flash. The pre-exposure flash may be any suitable pre-exposure flash such as, for example, an autofocus assist light (as discussed), a pre-flash for reducing red eyes or eye blinks, a dedicated reflecting surface detection pre-flash, or the like. As discussed, imaging device 101 may attain images at a certain frame rate for use by various components of imaging device 101.

Figure 3:
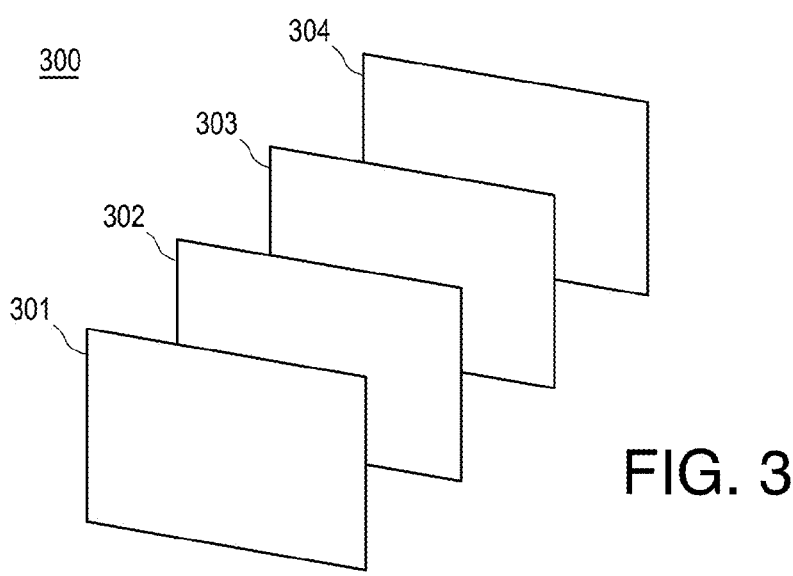
FIG. 3 illustrates example image frames attained by an imaging device.

FIG. 3 illustrates example image frames 300 attained by imaging device 101, arranged in accordance with at least some implementations of the present disclosure. As shown in FIG. 3, image frames 300 may be attained by imaging device 101. Image frames 300 may include any number of images 301, 302, 303, 304 and image frames 300 may be attained by imaging device 101 at times when camera 203 of imaging device 101 is activated, at times when imaging device 101 is active (e.g., even if a camera application is not being run by a user), at times when an exposure sequence has been initiated (e.g., based on a user initiation), or the like. For example, image frames 300 may be attained such that imaging device 101 may provide various functionality including autofocusing, image presentation to a user, or the like.

Image frames 300 may be attained at a preset frame rate such as 30 frames per second for example and image frames 300 may be used by imaging device 101 or various components of imaging device 101 via an imaging pipeline or the like. For example, image frames 300 or a subset thereof may be subjected to various processing techniques to generate imaging data for analysis. Such an imaging pipeline may be implemented in hardware of imaging device 101 for example. The processing techniques may include any suitable processing techniques and the resultant data may be available for evaluation or additional processing. The resultant data may include, for example, pixel level resolution data, down-sampled image data, filtered image data, brightness data, color balance data, or the like. The resultant data may be based on individual static images or pairs or groups of images. The resultant data sets from such processing may be at any resolution. For example, the resolution may be the same as the resolution of camera 203 (e.g., 8 megapixels or the like) or at a reduced resolution (e.g., 60×40 elements). Furthermore, the resultant data sets and/or images 301, 302, 303, 304 may be utilized for the image processing techniques discussed herein.

Figure 4:
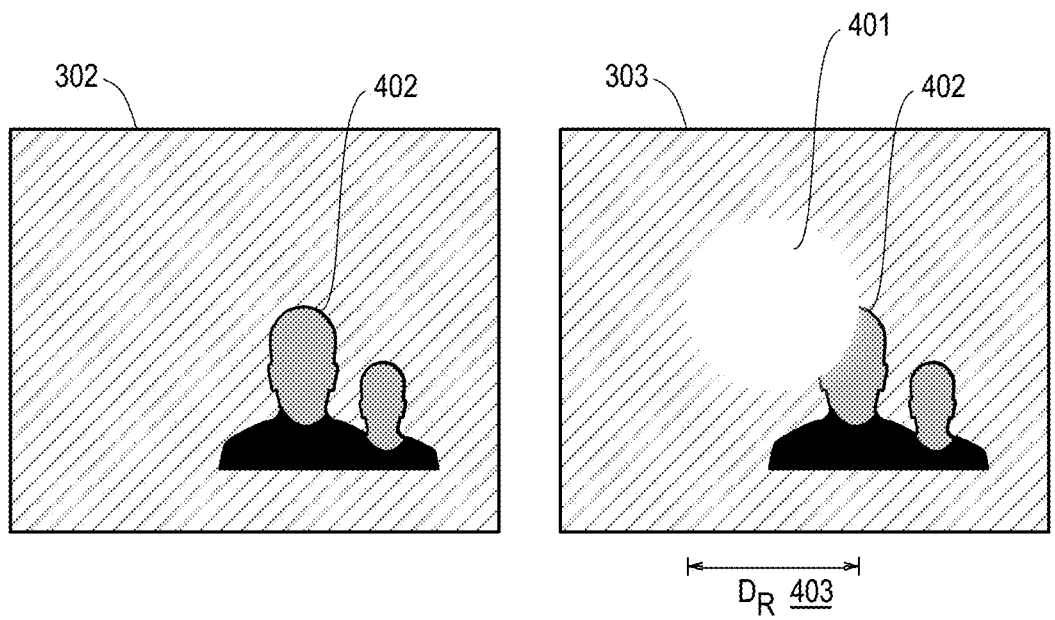
FIG. 4 illustrates example images attained by an imaging device.

FIG. 4 illustrates example images 302, 303 of image frames 300 attained by imaging device 101, arranged in accordance with at least some implementations of the present disclosure. As shown in FIG. 4, image 302 may include an object of interest 402 (e.g., a person or people). For example, image 302 may be an image attained by imaging device 101 before the discussed pre-exposure flash has been provided. FIG. 4 also illustrates image 303, which may include an image of the same scene and object of interest 402 and a reflection 401. For example, image 303 may be an image attained by imaging device 101 during the discussed pre-exposure flash has been provided and reflection 401 may be associated with a reflection off of flash reflecting surface 103. As used herein, an image may be considered during a pre-exposure flash when the effects of the pre-exposure flash (e.g. reflection 401) may be visible within or have an effect on the data associated with the image. As illustrated, in some examples, adjacent images (e.g., images 302, 303) of image frames 300 may be compared to determine reflection 401 and/or diameter 403 or the like; however any images of image frames 300 may be used to determine reflection 401. In other examples, the compared images may not be adjacent and instead they may have a gap of one or more intervening images between them. The detection of reflection may be based on an analysis of images 302, 303 or based on resultant data from one or more components of an imaging pipeline as discussed above. For example, resultant data from hardware operations performed on images 302, 303 may be analyzed to determine the presence of reflection 401.

The detection of reflection 401 may indicate the presence of flash reflecting surface 103. In some examples, the detection of reflection 401 may cause flash 204 to be disabled during an exposure as discussed herein. In other examples, the detection of reflection 401 may initiate an estimation of a distance to flash reflecting surface 103 and a determination of whether flash reflecting surface 103 is between imaging device 101 and object of interest 102. For example, a distance to flash reflecting surface 103 may be determined based on a size of reflection 401. As shown in FIG. 4, reflection 401 may have a diameter ($D_R$ 403). Based on diameter 403 and the characteristics of the pre-exposure flash (e.g., intensity/power of flash, flash angle, and the like), an estimate of the distance to flash reflecting surface 103 may be made. For example, the size of reflection 401 (e.g., diameter 403) may be inversely proportional to the distance to flash reflecting surface 103 such that a smaller size of reflection 401 (e.g., diameter 403) is associated with a longer distance to flash reflecting surface 103 and larger sizes of reflection 401 are associated with a shorter distance to flash reflecting surface 103. Although discussed with respect to a round flash reflection 401 and a size of reflection 401 represented by a diameter, any reflection shape and size representation may be used. For example, for a round flash, a circumference of reflection 401 may be used. In other examples, a square or rectangular flash may be represented by a width and/or height of reflection 401. Other shapes and size representations may be used. The size of reflection 401 (e.g., diameter 403 or the like) may be determined based on image 303 or based on resultant data from one or more components of an imaging pipeline as discussed herein.

As discussed, in some examples, a distance to flash reflecting surface 103 may be determined based on a size of reflection 401. In other examples, a distance to flash reflecting surface 103 may be determined based an intensity of reflection 401. For example, reflection 401 may not be burned out (as shown) and may instead provide intensity information or information for tracking and/or determining the distance to an object or the like. For example, techniques similar to autofocus techniques or the like may be used to determine a distance to flash reflecting surface 103. In other examples, the intensity of reflection 401 (or a portion or portions thereof) may be compared to an intensity of the same or a similar region of image 302 to determine a distance to flash reflecting surface 103. For example, based on the intensity of reflection 401, the known flash power, and/or the difference between the intensities of reflection 401 and the same region of 302, an estimation of a distance to flash reflecting surface 103 may be made.

Figure 5:
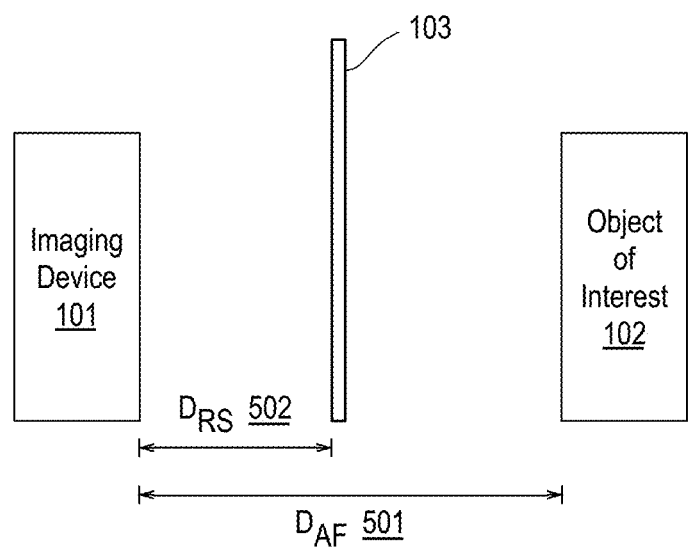
FIG. 5 illustrates an example autofocus distance and an example distance to a flash reflecting surface.

FIG. 5 illustrates an example autofocus distance 501 and an example distance to a flash reflecting surface 502, arranged in accordance with at least some implementations of the present disclosure. As shown in FIG. 5, autofocus distance 501 (e.g., $D_{AF}$ 501) may provide an estimate of the distance from imaging device 101 to object of interest 102 and distance to flash reflecting surface 502 (e.g., $D_{RS}$ 502) may provide an estimate of the distance from imaging device 101 to flash reflecting surface 103. In some examples, the disabling of flash 204 may be based on a comparison of autofocus distance 501 and distance to flash reflecting surface 502. For example, a difference between autofocus distance 501 and distance to flash reflecting surface 502 may be compared to threshold and, if the difference is greater than the threshold, it may be determined that flash reflecting surface 103 is between imaging device 101 and object of interest 102 and flash 204 may be disabled. For example, such a thresholding may provide for flash 204 to remain enabled when the object of interest 102 itself is the source of reflection 401 (e.g., when object of interest 102 is reflective) since the difference between autofocus distance 501 and distance to flash reflecting surface 502 would be less than the threshold. The discussed threshold may be any suitable threshold such as a predetermined or heuristically determined threshold with any suitable value such as a value in the range of about 0.5 to 3 meters, 1 to 5 meters, or 1 to 3 meters, or the like.

Although discussed with respect to a differencing and a threshold, other techniques may be used to compare autofocus distance 501 and distance to flash reflecting surface 502. For example, a ratio of the distances may be compared to a threshold. Furthermore, as discussed, autofocus distance 501 and distance to flash reflecting surface 502 may provide estimate values for comparison. In other examples, autofocus distance 501 and/or distance to flash reflecting surface 502 may include estimated range(s) of distances. In such examples, autofocus distance 501 and distance to flash reflecting surface 502 ranges may be compared such that if the ranges do not overlap, it is determined that flash reflecting surface 103 is between imaging device 101 and object of interest 102.

As discussed, in some examples, imaging device 101 may determine an autofocus distance 501. In other examples, imaging device 101 may determine an autofocus range associated with object of interest 102. For example, the autofocus range may indicate a range of the distance to object of interest 102 such that, for example, object of interest 102 may be deemed to be 3 to 5 meters or 3 meters or more (or the like) from imaging device 101. In some examples, imaging device 101 may deem an object of interest 102 as simply being "far" from imaging device 101. In such examples, imaging device 101 may use the longest distance in the range as autofocus distance 501. Furthermore, in examples where imaging device 101 determines object of interest 102 is far or at an effectively infinite distance (e.g., for the purpose of focusing) from imaging device 101, imaging device may assign a predetermined value (e.g., 20 meters, 50 meters, or 100 meters or the like) for the discussed differencing and thresholding or imaging device 101 may skip the discussed differencing and thresholding and disable flash 204 as discussed based on distance to flash reflecting surface 502 (of any value) and autofocus distance 501 having a logical value of far or effectively infinite or the like.

As discussed herein and, in particular, with respect to FIGS. 4 and 5, flash reflecting surface 103 may be determined to be between imaging device 101 and object of interest 102 based on a pre-exposure flash, evaluation of images attained via imaging device 101 at least one having reflection 401, and, in some examples, a comparison of autofocus distance 501 and distance to flash reflecting surface 502. In some examples, flash 204 may be disabled based on reflection 401 indicating flash reflecting surface 103 and, in other examples, flash 204 may be disabled only after comparing a difference of autofocus distance 501 and distance to flash reflecting surface 502 to a threshold. In other examples, other indications may be used to detect flash reflecting surface 103 and/or to estimate distance to flash reflecting surface 502.

In some examples, an environmental indicator may be determined for imaging device 101. For example, the environmental indicator may provide an indication of the environment in which imaging device 101 is currently located (e.g., a best guess environment of imaging device 101). For example, the environmental indicator may indicate imaging device 101 is in a building, in an automobile, in an open area, in an elevator, or the like. In some examples, the environmental indicator may be provided by imaging device 101 or a component thereof as part of a device enhancement, self-awareness, or artificial intelligence of imaging device 101.

The environmental indicator may be determined using any suitable technique or combination of techniques. For example, the environmental indicator may be determined based on an aural evaluation of an environment around imaging device 101. The aural evaluation may be performed based on data received via microphone 205 of imaging device 101 (please refer to FIG. 2). The aural evaluation may include the evaluation of audio waveforms received via microphone 205 that may be indicative of the environment around imaging device 101 and/or audio recognition techniques or the like.

In some examples, the environmental indicator may be determined based on a communications link between imaging device 101 and another device. For example, a Bluetooth communications link between imaging device 101 and an automobile may indicate imaging device 101 is within an automobile (e.g., the environmental indicator may include an inside automobile indicator) or a communications link between imaging device 101 and a desktop computer may indicate imaging device 101 is in an office or home setting (e.g., the environmental indicator may include an inside building indicator or the like). Although discussed with respect to a Bluetooth communications link, any suitable communications link may provide for an indication of the environment around imaging device 101.

In some examples, the environmental indicator may be determined based on an augmented reality evaluation of an environment around imaging device 101. For example, the augmented reality evaluation may include attaining images via camera 203 upon any movement or activation of imaging device 101. The attained images may be probed for object recognition and the recognized objects may be evaluated to determine the environment of imaging device 101. For example, the augmented reality evaluation may recognize a floor and a wall while a user removes imaging device 101 from their pocket. Based on the recognized floor and wall, imaging device 101 may determine it is within a building (e.g., the environmental indicator may include an inside building indicator or the like). In other examples, the augmented reality evaluation may recognize components of an automobile as the user begins to operate the device and the environmental indicator may include an inside automobile indicator or the like.

In some examples, the environmental indicator may be determined based on one or more mapping indicators and/or a map based evaluation. For example, global positioning system (GPS) positions or movement between positions may be used to provide the environmental indicator. For example, a GPS position(s) may be looked up and/or compared within a map to determine imaging device 101 is in a building (e.g., the environmental indicator may include an inside building indicator or the like) or that imaging device 101 is on a road (e.g., the environmental indicator may include an inside automobile indicator). Furthermore, GPS position movement at a speed above a certain threshold may also indicate imaging device 101 is within an automobile and the environmental indicator may include an inside automobile indicator or the like.

As discussed, in some examples, the described techniques may be combined to determine the environmental indicator. For example, one or more of an evaluation of the aural environment, an evaluation of communications link(s), location/map based evaluations, and/or augmented reality information may be combined in any suitable manner to determine the environmental indicator for imaging device 101.

In some examples, based on the environmental indicator, flash 204 may be disabled. For example, the environmental indicator may indicate a high likelihood that flash reflecting surface 103 is between imaging device 101 and object of interest 102. For example, if the environmental indicator indicates that imaging device 101 is within an automobile, flash 204 may be disabled.

In other examples, distance to flash reflecting surface 502 may be estimated based on the environmental indicator. For example, if the environmental indicator indicates that imaging device 101 is within an automobile, distance to flash reflecting surface 502 may be estimated to be a predetermined value such as 1 meter or the like. If the environmental indicator indicates that imaging device 101 is in a building, distance to flash reflecting surface 502 may be estimated to be a predetermined value such as 3 meters or the like. In some examples, such estimates may be relatively rough estimates that may be somewhat inaccurate but such estimates may be accurate enough for a comparison to autofocus distance 501 as discussed herein. In some examples, an estimated distance may include an estimated distance range. Furthermore, distance to flash reflecting surface 502 may be refined using any techniques as discussed herein. For example, if the environmental indicator indicates imaging device 101 is within a building, upon initiation of an exposure, GPS, aural information, augmented reality information or the like may be evaluated to refine distance to flash reflecting surface 502.

As discussed herein, distance to flash reflecting surface 502 (e.g., determined in any manner discussed) and autofocus distance 501 may be compared to determine whether flash reflecting surface 103 is between imaging device 101 and object of interest 102). In some examples, a difference between autofocus distance 501 and distance to flash reflecting surface 502 may be compared to threshold and, if the difference is greater than the threshold (as discussed above), it may be determined that flash reflecting surface 103 is between imaging device 101 and object of interest 102 and flash 204 may be disabled.

Figure 6:
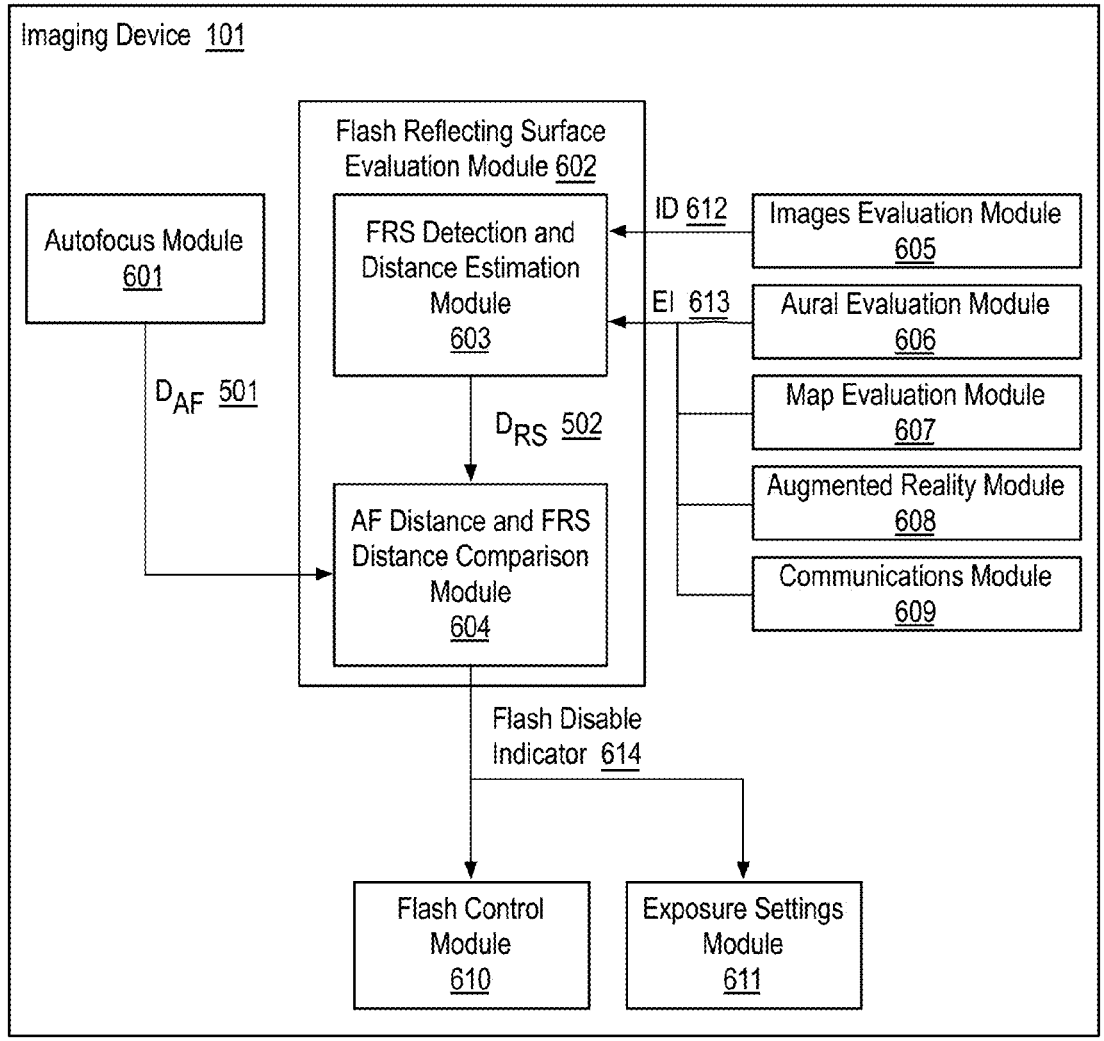
FIG. 6 is an illustrative block diagram of an example imaging device.

FIG. 6 is an illustrative block diagram of example imaging device 101, arranged in accordance with at least some implementations of the present disclosure. As shown in FIG. 6, imaging device 101 may include an autofocus module 601, a flash reflecting surface evaluation module 602, which may include a flash reflecting surface (FRS) detection and distance estimation module 603 and an autofocus (AF) distance and flash reflecting surface (FRS) distance comparison module 604, an images evaluation module 605, an aural environment evaluation module 606, a map evaluation module 607, an augmented reality module 608, a communications module 609, a flash control module 610, and an exposure settings module 605. In various examples, any of modules 601-611 of imaging device 101 may be implemented via one or more central processing unit(s) and/or one or more graphics processing unit(s) as is discussed further here with respect to FIG. 8.

As shown in FIG. 6, autofocus module 601 may determine autofocus distance 501.

Autofocus module 601 may determine autofocus distance 501 using any technique or techniques as discussed herein and autofocus module 601 may provide autofocus distance 501 to flash reflecting surface evaluation module 602. Also as shown, flash reflecting surface evaluation module 602 may, via flash reflecting surface detection and distance estimation module 603, detect a flash reflecting surface (e.g., flash reflecting surface 103) and generate a distance to flash reflecting surface 502. Flash reflecting surface detection and distance estimation module 603 may detect the flash reflecting surface and estimate distance to flash reflecting surface 502 using any technique or techniques as discussed herein.

For example, flash reflecting surface detection and distance estimation module 603 may receive image data (ID) 612 from images evaluation module 605. Images evaluation module 605 may evaluate image frames obtained via imaging device 101 (e.g., image frames 300, please refer to FIGS. 3 and 4) and images evaluation module 605 may generate image data 612 based on image frames 300. For example, image data 612 may include image frames 300 and/or data sets determined based on image frames 300. In an embodiment, images evaluation module 605 may implement an imaging pipeline or portions of an imaging pipeline as discussed herein and images evaluation module 605 may provide the resultant data to flash reflecting surface detection and distance estimation module 603 for evaluation.

Furthermore, flash reflecting surface detection and distance estimation module 603 may receive an environmental indicator (EI) 613 from one or more of aural environment evaluation module 606, map evaluation module 607, augmented reality module 608, and communications module 609. In some examples, environmental indicator 613 may include an indicator as discussed herein as to whether imaging device 101 is in an automobile, a building, or an open space or the like. In other examples, environmental indicator 613 may instead or in addition include raw data such that flash reflecting surface detection and distance estimation module 603 may determine the environment of imaging device 101. Furthermore, an environmental indicator aggregator and/or reconciler may be provided (not shown) that may aggregate environmental indicators and/or raw data from modules 605-609 and reconcile the received information to determine a best guess environment for imaging device 101. Such an aggregator and reconciler may be implemented within flash reflecting surface evaluation module 602 or outside of flash reflecting surface evaluation module 602 with the result being provided to flash reflecting surface evaluation module 602.

As described, flash reflecting surface detection and distance estimation module 603 may generate distance to flash reflecting surface 502 and provide distance to flash reflecting surface 502 to autofocus distance and flash reflecting surface distance comparison module 604, which may receive autofocus distance 501 and distance to flash reflecting surface 502. Autofocus distance and flash reflecting surface distance comparison module 604 may compare autofocus distance 501 and distance to flash reflecting surface 502 (e.g., based on taking there difference and comparing the difference to a threshold or in any other manner as discussed) to generate flash disable indicator 614. For example, if autofocus distance and flash reflecting surface distance comparison module 604 determines a flash reflecting surface is between imaging device 101 and an object of interest, flash disable indicator may be provided. If no flash reflecting surface is detected or if it is determined the flash reflecting surface is not between imaging device 101 and an object of interest (e.g., the object of interest itself is reflective or the like), no flash disable indicator may be provided.

As shown, flash disable indicator 614 may be provided to flash control module 610 and/or exposure settings module 611. Flash control module 610 may, in response to flash disable indicator 614, disable a flash (e.g., flash 204) of imaging device 101 during an exposure of an object of interest, as discussed. Exposure settings module 611 may adjust exposure settings for the exposure based on flash disable indicator 614. For example, since the flash will be disabled, a shutter speed/exposure capture duration for the exposure may be increased and/or a film speed/digital camera ISO for the exposure may be increased. Although discussed with respect to shutter speed (or equivalents) and/or ISO (or equivalents), other exposure settings may be adjusted.

Utilizing the discussed techniques, imaging device 101 may attain a suitable image for exposure setting 100 (please refer to FIG. 1) such that object of interest 102 and any associated scene around object of interest 102 may be captured. As discussed, in some implementations, exposure compromises (e.g., no flash and adjustment of exposure settings) may have been made to attain the image; however, the attained image may provide for a suitable capture of object of interest 102 such that the image is not obscured by an undesirable glare.

FIG. 7 is a flow diagram illustrating an example process 700 for providing anti-glare exposures, arranged in accordance with at least some implementations of the present disclosure. Process 700 may include one or more operations 701-705 as illustrated in FIG. 7. Process 700 may form at least part of an anti-glare exposure process. By way of non-limiting example, process 700 may form at least part of an anti-glare exposure process for imaging device 101 as discussed herein. Furthermore, process 700 will be described herein with reference to system 800 of FIG. 8.

Figure 8:
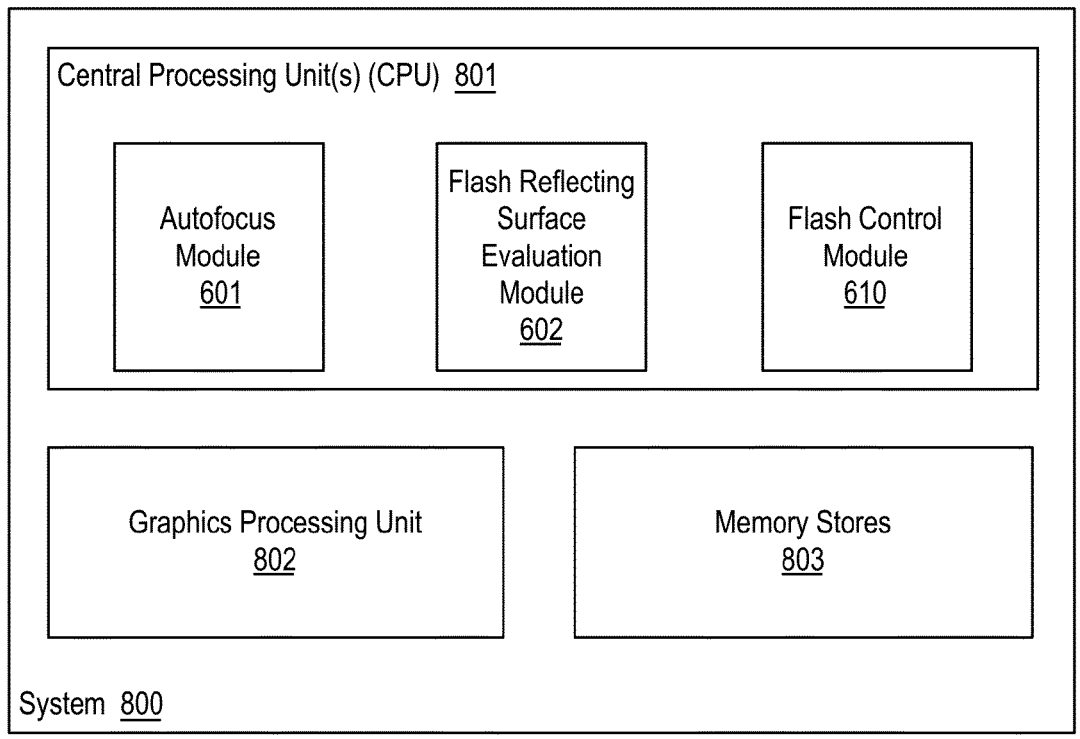
FIG. 8 is an illustrative diagram of an example system.

FIG. 8 is an illustrative diagram of an example system 800, arranged in accordance with at least some implementations of the present disclosure. As shown in FIG. 8, system 800 may include one or more central processing units (CPU) 801, a graphics processing unit (GPU) 802, and memory stores 803. Also as shown, CPU 801 may include autofocus module 601, flash reflecting surface evaluation module 602, and flash control module 610. In the example of system 800, memory stores 803 may store image content such as captured images (or image frames) or image related data such as image data generated via an imaging pipeline and/or system content such as one or more environmental indicators or data used to determine the environmental indicator (s), and/or any other data as discussed herein.

As shown, in some examples, autofocus module 601, flash reflecting surface evaluation module 602, and flash control module 610 may be implemented via central processing units 1001. In other examples, one or more of autofocus module 601, flash reflecting surface evaluation module 602, and flash control module 610 may be implemented via graphics processing unit 1002. Furthermore, flash reflecting surface evaluation module 602 may include and/or implement flash reflecting surface detection and distance estimation module 603 and/or autofocus distance and flash reflecting surface distance comparison module 604 as discussed herein with respect to FIG. 6. Furthermore, system 800 may include images evaluation module 605, aural environment evaluation module 606, map evaluation module 607, augmented reality module 608, communications module 609, and/or exposure settings module 610 as discussed herein with respect to FIG. 6 implemented via central processing units 801 and/or graphics processing units 802.

Graphics processing unit 802 may include any number and type of graphics processing units that may provide the operations as discussed herein. Such operations may be implemented via software or hardware or a combination thereof. For example, graphics processing unit 802 may include circuitry dedicated to manipulate images obtained from memory stores 803. Central processing units 801 may include any number and type of processing units or modules that may provide control and other high level functions for system 800 and/or provide any operations as discussed herein. Memory stores 803 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 803 may be implemented by cache memory. In an embodiment, one or more of autofocus module 601, flash reflecting surface evaluation module 602, and flash control module 610 (or other modules discussed herein) may be implemented via an execution unit (EU) of graphics processing unit 802. The EU may include, for example, programmable logic or circuitry such as a logic core or cores that may provide a wide array of programmable logic functions. In an embodiment, one or more of autofocus module 601, flash reflecting surface evaluation module 602, and flash control module 610 (or other modules discussed herein) may be implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 7, process 700 may begin at operation 701, "Determine an Autofocus Distance to an Object of Interest", where an autofocus distance to an object of interest may be determined. For example, autofocus module 601 as implemented via central processing unit 801 of imaging device 101 may determine autofocus distance 501 for object of interest 102 as discussed herein.

Processing may continue at operation 702, "Detect a Flash Reflecting Surface", where a flash reflecting surface may be detected. For example, flash reflecting surface evaluation module 602 (e.g., via flash reflecting surface detection and distance estimation module 603) as implemented via central processing unit 801 of imaging device 101 may detect flash reflecting surface 103 as discussed herein. In some examples, detecting flash reflecting surface 103 may include providing a pre-exposure flash and comparing an image or frame from before the pre-exposure flash to an image or frame during the pre-exposure flash (e.g., such that the pre-exposure flash impacts the image or frame) to determine a reflection of the pre-exposure flash in the image or frame from during the pre-exposure flash. In other examples, detecting flash reflecting surface 103 may include determining an environmental indicator associated with the imaging device (e.g., based on an aural evaluation of an environment around the imaging device, an augmented reality evaluation of the environment around the imaging device, a communications link to another device, or a map based evaluation of the imaging device).

Processing may continue at operation 703, "Estimate a Distance to the Flash Reflecting Surface", where a distance to the flash reflecting surface may be estimated. For example, flash reflecting surface evaluation module 602 (e.g., via flash reflecting surface detection and distance estimation module 603) as implemented via central processing unit 801 of imaging device 101 may estimate distance to flash reflecting surface 502 as discussed herein. In some examples, estimating the distance to the flash reflecting surface may be based on the size of a reflection from a pre-exposure flash as discussed herein. In other examples, estimating the distance to the flash reflecting surface may be based on an environmental indicator (e.g., an approximate distance may be associated with a particular environmental indicator).

Processing may continue at operation 704, "Determine the Flash Reflecting Surface is Between the Imaging Device and the Object of Interest", where the flash reflecting surface may be determined to be between the imaging device and the object of interest based on a comparison of the autofocus distance and the distance to the flash reflecting surface. For example, flash reflecting surface evaluation module 602 (e.g., via autofocus distance and flash reflecting surface distance comparison module 604) as implemented via central processing unit 801 of imaging device 101 may determine flash reflecting surface 103 is between imaging device 101 and object of interest 102 based on a comparison of autofocus distance 501 and distance to flash reflecting surface 502 as discussed herein. In some examples, determining flash reflecting surface 103 is between imaging device 101 and object of interest 102 may be based on a difference between autofocus distance 501 and distance to flash reflecting surface 502 being compared to a threshold (e.g., the difference being greater than a threshold). As discussed, in some examples, autofocus distance 501 may be based on a determined autofocus distance range (e.g., 3 to 5 meters or 3 meters or more or the like) such that autofocus distance 501 is the longest distance in the autofocus distance range. In some examples, autofocus distance 501 may be a logical value such as far or effectively infinite (e.g., for the purpose of focusing) or the like and flash reflecting surface 103 may be determined to be between imaging device 101 and object of interest 102 based on distance to flash reflecting surface 502 being substantially any value less than far or effectively infinite or the like.

Processing may continue at operation 705, "Disable Flash during Exposure", where a flash of the imaging device may be disabled during an exposure of the object of interest based on the determination the flash reflecting surface is between the imaging device and the object of interest. For example, flash control module 610 may disable flash 204 of imaging device 101 during an exposure of object of interest 102 based on the determination flash reflecting surface 103 is between imaging device 101 and object of interest 102. In some examples, exposure settings that take into account the flash being disabled may also be updated prior to the exposure of the object of interest.

Process 700 may be repeated any number of times either in series or in parallel for any number of exposures implemented via a user of imaging device 101. As discussed process 700 may provide for disabling a flash without user intervention such that the discussed process provides ease of use during exposure. For example, a user does not have to override automatic settings or make any adjustments to attain glare free (e.g., anti-glare) images as discussed herein.

Various components of the systems described herein may be implemented in software, firmware, and/or hardware and/or any combination thereof. For example, various components of imaging device 101 or systems 800, 900, or 1000 may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of imaging device 101 or systems 800, 900, or 1000, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 9:
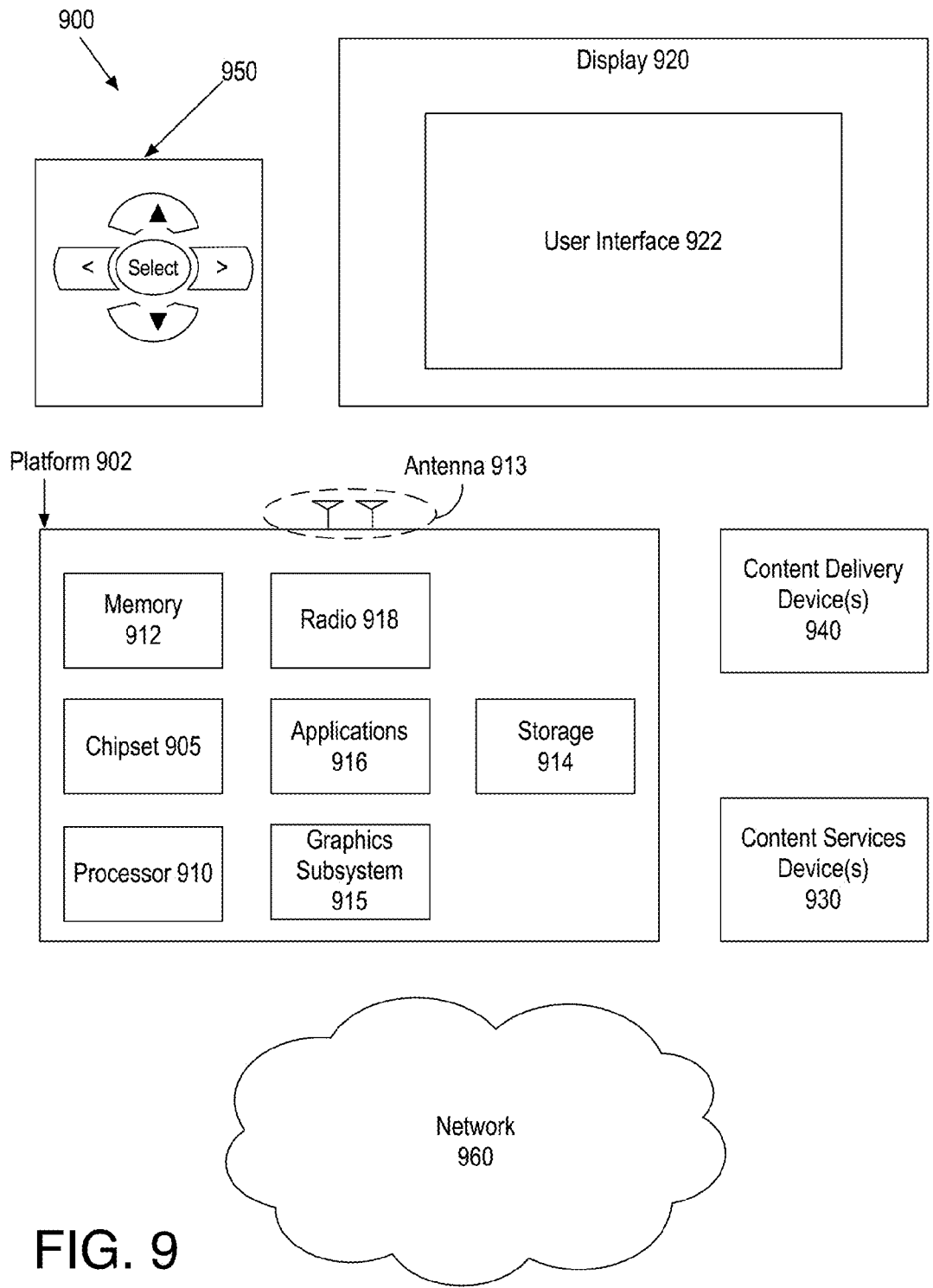
FIG. 9 is an illustrative diagram of an example system.

FIG. 9 is an illustrative diagram of an example system 900, arranged in accordance with at least some implementations of the present disclosure. In various implementations, system 900 may be a media system although system 900 is not limited to this context. For example, system 900 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 900 includes a platform 902 coupled to a display 920. Platform 902 may receive content from a content device such as content services device(s) 930 or content delivery device(s) 940 or other similar content sources. A navigation controller 950 including one or more navigation features may be used to interact with, for example, platform 902 and/or display 920. Each of these components is described in greater detail below.

In various implementations, platform 902 may include any combination of a chipset 905, processor 910, memory 912, antenna 913, storage 914, graphics subsystem 915, applications 916 and/or radio 918. Chipset 905 may provide intercommunication among processor 910, memory 912, storage 914, graphics subsystem 915, applications 916 and/or radio 918. For example, chipset 905 may include a storage adapter (not depicted) capable of providing intercommunication with storage 914.

Processor 910 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 910 may be dual-core processor(s), dual-core mobile processor(s), and so forth.

Memory 912 may be implemented as a volatile memory device such as, but not limited to, a Random Access Memory (RAM), Dynamic Random Access Memory (DRAM), or Static RAM (SRAM).

Storage 914 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 914 may include technology to increase the storage performance enhanced protection for valuable digital media when multiple hard drives are included, for example.

Graphics subsystem 915 may perform processing of images such as still or video for display. Graphics subsystem 915 may be a graphics processing unit (GPU) or a visual processing unit (VPU), for example. An analog or digital interface may be used to communicatively couple graphics subsystem 915 and display 920. For example, the interface may be any of a High-Definition Multimedia Interface, DisplayPort, wireless HDMI, and/or wireless HD compliant techniques. Graphics subsystem 915 may be integrated into processor 910 or chipset 905. In some implementations, graphics subsystem 915 may be a stand-alone device communicatively coupled to chipset 905.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 918 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 918 may operate in accordance with one or more applicable standards in any version.

In various implementations, display 920 may include any television type monitor or display. Display 920 may include, for example, a computer display screen, touch screen display, video monitor, television-like device, and/or a television. Display 920 may be digital and/or analog. In various implementations, display 920 may be a holographic display. Also, display 920 may be a transparent surface that may receive a visual projection. Such projections may convey various forms of information, images, and/or objects. For example, such projections may be a visual overlay for a mobile augmented reality (MAR) application. Under the control of one or more software applications 916, platform 902 may display user interface 922 on display 920.

In various implementations, content services device(s) 930 may be hosted by any national, international and/or independent service and thus accessible to platform 902 via the Internet, for example. Content services device(s) 930 may be coupled to platform 902 and/or to display 920. Platform 902 and/or content services device(s) 930 may be coupled to a network 960 to communicate (e.g., send and/or receive) media information to and from network 960. Content delivery device(s) 940 also may be coupled to platform 902 and/or to display 920.

In various implementations, content services device(s) 930 may include a cable television box, personal computer, network, telephone, Internet enabled devices or appliance capable of delivering digital information and/or content, and any other similar device capable of uni-directionally or bi-directionally communicating content between content providers and platform 902 and/display 920, via network 960 or directly. It will be appreciated that the content may be communicated uni-directionally and/or bi-directionally to and from any one of the components in system 900 and a content provider via network 960. Examples of content may include any media information including, for example, video, music, medical and gaming information, and so forth.

Content services device(s) 930 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 902 may receive control signals from navigation controller 950 having one or more navigation features. The navigation features of controller 950 may be used to interact with user interface 922, for example. In various embodiments, navigation controller 950 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 950 may be replicated on a display (e.g., display 920) by movements of a pointer, cursor, focus ring, or other visual indicators displayed on the display. For example, under the control of software applications 916, the navigation features located on navigation controller 950 may be mapped to virtual navigation features displayed on user interface 922, for example. In various embodiments, controller 950 may not be a separate component but may be integrated into platform 902 and/or display 920. The present disclosure, however, is not limited to the elements or in the context shown or described herein.

In various implementations, drivers (not shown) may include technology to enable users to instantly turn on and off platform 902 like a television with the touch of a button after initial boot-up, when enabled, for example. Program logic may allow platform 902 to stream content to media adaptors or other content services device(s) 930 or content delivery device(s) 940 even when the platform is turned "off." In addition, chipset 905 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 900 may be integrated. For example, platform 902 and content services device(s) 930 may be integrated, or platform 902 and content delivery device(s) 940 may be integrated, or platform 902, content services device(s) 930, and content delivery device(s) 940 may be integrated, for example. In various embodiments, platform 902 and display 920 may be an integrated unit. Display 920 and content service device(s) 930 may be integrated, or display 920 and content delivery device(s) 940 may be integrated, for example. These examples are not meant to limit the present disclosure.

In various embodiments, system 900 may be implemented as a wireless system, a wired system, or a combination of both. When implemented as a wireless system, system 900 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 900 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 902 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 9.

Figure 10:
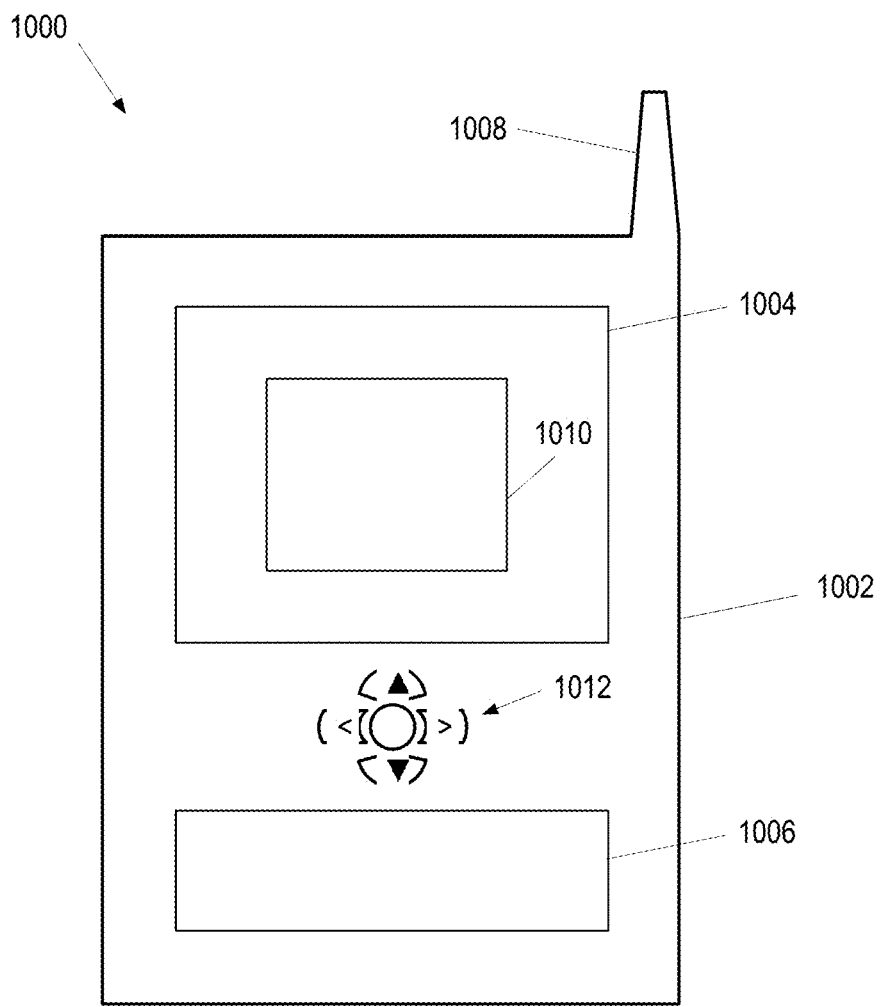
FIG. 10 illustrates an example device, all arranged in accordance with at least some implementations of the present disclosure.

As described above, system 900 may be embodied in varying physical styles or form factors. FIG. 10 illustrates implementations of a small form factor device 1000 in which system 1000 may be embodied. In various embodiments, for example, device 1000 may be implemented as a mobile computing device a having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 10, device 1000 may include a housing 1002, a display 1004, an input/output (I/O) device 1006, and an antenna 1008. Device 1000 also may include navigation features 1012. Display 1004 may include any suitable display unit for displaying information appropriate for a mobile computing device. I/O device 1006 may include any suitable I/O device for entering information into a mobile computing device. Examples for I/O device 1006 may include an alphanumeric keyboard, a numeric keypad, a touch pad, input keys, buttons, switches, rocker switches, microphones, speakers, voice recognition device and software, and so forth. Information also may be entered into device 1000 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one or more first embodiments, a method providing anti-glare exposures for an imaging device comprises determining an autofocus distance to an object of interest, estimating a distance to a flash reflecting surface, determining the flash reflecting surface is between the imaging device and the object of interest based on a comparison of the autofocus distance and the distance to the flash reflecting surface, and disabling a flash of the imaging device during an exposure of the object of interest based on the determination the flash reflecting surface is between the imaging device and the object of interest.

Further to the first embodiments, the method may further comprise detecting the flash reflecting surface.

Further to the first embodiments, the method may further comprise detecting the flash reflecting surface, wherein detecting the flash reflecting surface comprises providing a pre-exposure flash and comparing a first image frame from before the pre-exposure flash to a second image frame during the pre-exposure flash to determine a reflection of the pre-exposure flash in the second image.

Further to the first embodiments, the method may further comprise detecting the flash reflecting surface, wherein detecting the flash reflecting surface comprises providing a pre-exposure flash and comparing a first image frame from before the pre-exposure flash to a second image frame during the pre-exposure flash to determine a reflection of the pre-exposure flash in the second image, wherein estimating the distance to the flash reflecting surface comprises estimating the distance to the reflecting surface based on at least one of a size of the reflection or an intensity of the reflection.

Further to the first embodiments, the method may further comprise detecting the flash reflecting surface, wherein detecting the flash reflecting surface comprises determining an environmental indicator associated with the imaging device, and wherein estimating the distance to the flash reflecting surface is based on the environmental indicator.

Further to the first embodiments, the method may further comprise detecting the flash reflecting surface, wherein detecting the flash reflecting surface comprises determining an environmental indicator associated with the imaging device, and wherein estimating the distance to the flash reflecting surface is based on the environmental indicator, wherein the environmental indicator is determined based on an aural evaluation of an environment around the imaging device.

Further to the first embodiments, the method may further comprise detecting the flash reflecting surface, wherein detecting the flash reflecting surface comprises determining an environmental indicator associated with the imaging device, and wherein estimating the distance to the flash reflecting surface is based on the environmental indicator, wherein the environmental indicator is determined based on an augmented reality evaluation of an environment around the imaging device.

Further to the first embodiments, the method may further comprise detecting the flash reflecting surface, wherein detecting the flash reflecting surface comprises determining an environmental indicator associated with the imaging device, and wherein estimating the distance to the flash reflecting surface is based on the environmental indicator, wherein the environmental indicator is determined based on a communications link to a second device.

Further to the first embodiments, the method may further comprise detecting the flash reflecting surface, wherein detecting the flash reflecting surface comprises determining an environmental indicator associated with the imaging device, and wherein estimating the distance to the flash reflecting surface is based on the environmental indicator, wherein the environmental indicator is determined based on a communications link to a second device, and wherein the communications link comprises a Bluetooth link and the second device comprises an automobile.

Further to the first embodiments, the method may further comprise detecting the flash reflecting surface, wherein detecting the flash reflecting surface comprises determining an environmental indicator associated with the imaging device, and wherein estimating the distance to the flash reflecting surface is based on the environmental indicator, wherein the environmental indicator is determined based on a map based evaluation of the imaging device.

Further to the first embodiments, the method may further comprise detecting the flash reflecting surface by providing a pre-exposure flash and comparing a first image frame from before the pre-exposure flash to a second image frame during the pre-exposure flash to determine a reflection of the pre-exposure flash in the second image.

Further to the first embodiments, the method may further comprise detecting the flash reflecting surface by providing a pre-exposure flash and comparing a first image frame from before the pre-exposure flash to a second image frame during the pre-exposure flash to determine a reflection of the pre-exposure flash in the second image, wherein estimating the distance to the flash reflecting surface comprises estimating the distance to the reflecting surface based on at least one of a size of the reflection or an intensity of the reflection.

Further to the first embodiments, estimating the distance to the flash reflecting surface comprises estimating the distance to the reflecting surface based on at least one of a size of the reflection or an intensity of the reflection.

Further to the first embodiments, estimating the distance to the flash reflecting surface comprises estimating the distance to the reflecting surface based on at least one of a size of the reflection or an intensity of the reflection, wherein the environmental indicator is determined based on at least one of an aural evaluation of an environment around the imaging device, an augmented reality evaluation of an environment around the imaging device, a communications link to a second device, or a map based evaluation of the imaging device.

Further to the first embodiments, the flash reflecting surface is determined to be between the object of interest and the imaging device when a difference between the autofocus distance and the distance to the reflecting surface is greater than a threshold.

Further to the first embodiments, the autofocus distance is based on a determined autofocus distance range, and wherein the autofocus distance comprises at least one of the longest distance in the autofocus distance range, a predetermined value associated with the longest distance in the autofocus distance range, or a logical value associated with the longest distance in the autofocus distance range.

Further to the first embodiments, the method further comprises updating exposure settings for the exposure based on the flash being disabled.

Further to the first embodiments, the imaging device comprises at least one of a camera, a smartphone, an ultrabook, a laptop, or a tablet, and wherein the imaging device is in an auto-exposure mode.

In one or more second embodiments, a system for providing anti-glare exposures for an imaging device comprises a memory configured to store image data and a central processing unit coupled to the memory, wherein the central processing unit comprises autofocus circuitry configured to determine an autofocus distance to an object of interest, flash reflecting surface evaluation circuitry configured to estimate a distance to a flash reflecting surface and to determine the flash reflecting surface is between the imaging device and the object of interest based on a comparison of the autofocus distance and the distance to the flash reflecting surface, and flash control circuitry configured to disable a flash of the imaging device during an exposure of the object of interest based on the determination the flash reflecting surface is between the imaging device and the object of interest.

Further to the second embodiments, the flash reflecting surface evaluation circuitry is further configured to detect the flash reflecting surface based on the flash control circuitry being configured to provide a pre-exposure flash and the flash reflecting surface evaluation circuitry being configured to compare a first image frame from before the pre-exposure flash to a second image frame during the pre-exposure flash to determine a reflection of the pre-exposure flash in the second image detect the flash reflecting surface.

Further to the second embodiments, the flash reflecting surface evaluation circuitry is further configured to detect the flash reflecting surface based on the flash control circuitry being configured to provide a pre-exposure flash and the flash reflecting surface evaluation circuitry being configured to compare a first image frame from before the pre-exposure flash to a second image frame during the pre-exposure flash to determine a reflection of the pre-exposure flash in the second image detect the flash reflecting surface, wherein the flash reflecting surface evaluation circuitry is configured to estimate the distance to the flash reflecting surface based on at least one of a size of the reflection or an intensity of the reflection.

Further to the second embodiments, the flash reflecting surface evaluation circuitry is further configured to detect the flash reflecting surface based on the flash control circuitry being configured to provide a pre-exposure flash and the flash reflecting surface evaluation circuitry being configured to compare a first image frame from before the pre-exposure flash to a second image frame during the pre-exposure flash to determine a reflection of the pre-exposure flash in the second image detect the flash reflecting surface, and wherein the flash reflecting surface evaluation circuitry is configured to estimate the distance to the flash reflecting surface based on at least one of a size of the reflection or an intensity of the reflection.

Further to the second embodiments, the flash reflecting surface evaluation circuitry is further configured to detect the flash reflecting surface and to estimate the distance to the flash reflecting surface based on an environmental indicator associated with the imaging device.

Further to the second embodiments, the flash reflecting surface evaluation circuitry is further configured to detect the flash reflecting surface and to estimate the distance to the flash reflecting surface based on an environmental indicator associated with the imaging device, wherein the environmental indicator is based on at least one of an aural evaluation of an environment around the imaging device, an augmented reality evaluation of the environment around the imaging device, a communications link to a second device, or a map based evaluation of the imaging device.

Further to the second embodiments, the flash reflecting surface evaluation circuitry is further configured to detect the flash reflecting surface and to estimate the distance to the flash reflecting surface based on an environmental indicator associated with the imaging device, wherein the environmental indicator is based on an aural evaluation of an environment around the imaging device.

Further to the second embodiments, the flash reflecting surface evaluation circuitry is further configured to detect the flash reflecting surface and to estimate the distance to the flash reflecting surface based on an environmental indicator associated with the imaging device, wherein the environmental indicator is based on an augmented reality evaluation of the environment around the imaging device.

Further to the second embodiments, the flash reflecting surface evaluation circuitry is further configured to detect the flash reflecting surface and to estimate the distance to the flash reflecting surface based on an environmental indicator associated with the imaging device, wherein the environmental indicator is based on a communications link to a second device.

Further to the second embodiments, the flash reflecting surface evaluation circuitry is further configured to detect the flash reflecting surface and to estimate the distance to the flash reflecting surface based on an environmental indicator associated with the imaging device, wherein the environmental indicator is based on or a map based evaluation of the imaging device.

Further to the second embodiments, the flash reflecting surface evaluation circuitry is further configured to detect the flash reflecting surface and to estimate the distance to the flash reflecting surface based on an environmental indicator associated with the imaging device, and wherein the environmental indicator is based on at least one of an aural evaluation of an environment around the imaging device, an augmented reality evaluation of the environment around the imaging device, a communications link to a second device, or a map based evaluation of the imaging device.

Further to the second embodiments, the flash reflecting surface is determined to be between the object of interest and the imaging device when a difference between the autofocus distance and the distance to the reflecting surface is greater than a threshold.

In one or more third embodiments, a system for providing object detection on a computing device comprises a memory configured to store image data and a central processing unit coupled to the memory, wherein the central processing unit comprises means for determining an autofocus distance to an object of interest, means for estimating a distance to a flash reflecting surface, means for determining the flash reflecting surface is between the imaging device and the object of interest based on a comparison of the autofocus distance and the distance to the flash reflecting surface, and means for disabling a flash of the imaging device during an exposure of the object of interest based on the determination the flash reflecting surface is between the imaging device and the object of interest.

Further to the third embodiments, the means for determining the flash reflecting surface is between the imaging device and the object of interest detect the flash reflecting surface comprise means for providing a pre-exposure flash and means for comparing a first image frame from before the pre-exposure flash to a second image frame during the pre-exposure flash to determine a reflection of the pre-exposure flash in the second image.

Further to the third embodiments, the means for the determining flash reflecting surface is between the imaging device and the object of interest detect the flash reflecting surface comprise means for generating an environmental indicator associated with the imaging device, and wherein the environmental indicator is based on at least one of an aural evaluation of an environment around the imaging device, an augmented reality evaluation of the environment around the imaging device, a communications link to a second device, or a map based evaluation of the imaging device.

Further to the third embodiments, the flash reflecting surface is determined to be between the object of interest and the imaging device when a difference between the autofocus distance and the distance to the reflecting surface is greater than a threshold.

In one or more fourth embodiments, at least one machine readable medium comprises a plurality of instructions that in response to being executed on an imaging device, cause the imaging device to provide anti-glare exposures by determining an autofocus distance to an object of interest, estimating a distance to a flash reflecting surface, determining the flash reflecting surface is between the imaging device and the object of interest based on a comparison of the autofocus distance and the distance to the flash reflecting surface, and disabling a flash of the imaging device during an exposure of the object of interest based on the determination the flash reflecting surface is between the imaging device and the object of interest.

Further to the fourth embodiments, the machine readable medium further comprises instructions that cause the computing device to provide anti-glare exposures by detecting the flash reflecting surface, wherein detecting the flash reflecting surface comprises providing a pre-exposure flash and comparing a first image frame from before the pre-exposure flash to a second image frame during the pre-exposure flash to determine a reflection of the pre-exposure flash in the second image.

Further to the fourth embodiments, the machine readable medium further comprises instructions that cause the computing device to provide anti-glare exposures by detecting the flash reflecting surface, wherein detecting the flash reflecting surface comprises providing a pre-exposure flash and comparing a first image frame from before the pre-exposure flash to a second image frame during the pre-exposure flash to determine a reflection of the pre-exposure flash in the second image, wherein estimating the distance to the flash reflecting surface comprises estimating the distance to the reflecting surface based on at least one of a size of the reflection or an intensity of the reflection.

Further to the fourth embodiments, the machine readable medium further comprises instructions that cause the computing device to provide anti-glare exposures by detecting the flash reflecting surface, wherein detecting the flash reflecting surface comprises determining an environmental indicator associated with the imaging device, wherein estimating the distance to the flash reflecting surface is based on the environmental indicator.

Further to the fourth embodiments, the machine readable medium further comprises instructions that cause the computing device to provide anti-glare exposures by detecting the flash reflecting surface, wherein detecting the flash reflecting surface comprises determining an environmental indicator associated with the imaging device, wherein estimating the distance to the flash reflecting surface is based on the environmental indicator, wherein the environmental indicator is based on at least one of an aural evaluation of an environment around the imaging device, an augmented reality evaluation of the environment around the imaging device, a communications link to a second device, or a map based evaluation of the imaging device.

Further to the fourth embodiments, the machine readable medium further comprises instructions that cause the computing device to provide anti-glare exposures by detecting the flash reflecting surface, wherein detecting the flash reflecting surface comprises providing a pre-exposure flash and comparing a first image frame from before the pre-exposure flash to a second image frame during the pre-exposure flash to determine a reflection of the pre-exposure flash in the second image, and wherein estimating the distance to the flash reflecting surface comprises estimating the distance to the reflecting surface based on at least one of a size of the reflection or an intensity of the reflection.

Further to the fourth embodiments, the machine readable medium further comprises instructions that cause the computing device to provide anti-glare exposures by detecting the flash reflecting surface, wherein detecting the flash reflecting surface comprises determining an environmental indicator associated with the imaging device, wherein estimating the distance to the flash reflecting surface is based on the environmental indicator and wherein the environmental indicator is based on at least one of an aural evaluation of an environment around the imaging device, an augmented reality evaluation of the environment around the imaging device, a communications link to a second device, or a map based evaluation of the imaging device.

In on or more fifth embodiments, at least one machine readable medium may include a plurality of instructions that in response to being executed on a computing device, causes the computing device to perform a method according to any one of the above embodiments.

In on or more sixth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A method for providing anti-glare exposures for an imaging device comprising:
    determining an autofocus distance to an object of interest;
    estimating a distance to a flash reflecting surface;
    determining the flash reflecting surface is between the imaging device and the object of interest based on a comparison of the autofocus distance and the distance to the flash reflecting surface; and
    disabling a flash of the imaging device during an exposure of the object of interest based on the determination the flash reflecting surface is between the imaging device and the object of interest.

2. The method of claim 1, wherein the flash reflecting surface is determined to be between the object of interest and the imaging device when a difference between the autofocus distance and the distance to the reflecting surface is greater than a threshold.

3. The method of claim 1, wherein the autofocus distance is based on a determined autofocus distance range, and wherein the autofocus distance comprises at least one of the longest distance in the autofocus distance range, a predetermined value associated with the longest distance in the autofocus distance range, or a logical value associated with the longest distance in the autofocus distance range.

4. The method of claim 1, further comprising:
    updating exposure settings for the exposure based on the flash being disabled.

5. The method of claim 1, wherein the imaging device comprises at least one of a camera, a smartphone, an ultrabook, a laptop, or a tablet, and wherein the imaging device is in an auto-exposure mode.

6. The method of claim 1, further comprising:
    detecting the flash reflecting surface.

7. The method of claim 6, wherein detecting the flash reflecting surface comprises:
    providing a pre-exposure flash; and
    comparing a first image frame from before the pre-exposure flash to a second image frame during the pre-exposure flash to determine a reflection of the pre-exposure flash in the second image.

8. The method of claim 7, wherein estimating the distance to the flash reflecting surface comprises estimating the distance to the reflecting surface based on at least one of a size of the reflection or an intensity of the reflection.

9. The method of claim 6, wherein detecting the flash reflecting surface comprises determining an environmental indicator associated with the imaging device, wherein the environmental indicator provides an indication of the environment in which the imaging device is currently located, and wherein estimating the distance to the flash reflecting surface is based on the environmental indicator.

10. The method of claim 9, wherein the environmental indicator is determined based on an aural evaluation of an environment around the imaging device.

11. The method of claim 9, wherein the environmental indicator is determined based on an augmented reality evaluation of an environment around the imaging device.

12. The method of claim 9, wherein the environmental indicator is determined based on a map based evaluation of the imaging device.

13. The method of claim 9, wherein the environmental indicator is determined based on a communications link to a second device.

14. The method of claim 13, wherein the communications link comprises a Bluetooth link and the second device comprises an automobile.

15. A system for providing anti-glare exposures for an imaging device, comprising:
    a memory configured to store image data; and
    a central processing unit coupled to the memory, wherein the central processing unit comprises:
        autofocus circuitry configured to determine an autofocus distance to an object of interest;

flash reflecting surface evaluation circuitry configured to estimate a distance to a flash reflecting surface and to determine the flash reflecting surface is between the imaging device and the object of interest based on a comparison of the autofocus distance and the distance to the flash reflecting surface; and flash control circuitry configured to disable a flash of the imaging device during an exposure of the object of interest based on the determination the flash reflecting surface is between the imaging device and the object of interest.

16. The system of claim 15, wherein the flash reflecting surface is determined to be between the object of interest and the imaging device when a difference between the autofocus distance and the distance to the reflecting surface is greater than a threshold.

17. The system of claim 15, wherein the flash reflecting surface evaluation circuitry is further configured to detect the flash reflecting surface based on the flash control circuitry being configured to provide a pre-exposure flash and the flash reflecting surface evaluation circuitry being configured to compare a first image frame from before the pre-exposure flash to a second image frame during the pre-exposure flash to determine a reflection of the pre-exposure flash in the second image detect the flash reflecting surface.

18. The system of claim 17, wherein the flash reflecting surface evaluation circuitry is configured to estimate the distance to the flash reflecting surface based on at least one of a size of the reflection or an intensity of the reflection.

19. The system of claim 15, wherein the flash reflecting surface evaluation circuitry is further configured to detect the flash reflecting surface and to estimate the distance to the flash reflecting surface based on an environmental indicator associated with the imaging device, wherein the environmental indicator provides an indication of the environment in which the imaging device is currently located.

20. The system of claim 19, wherein the environmental indicator is based on at least one of an aural evaluation of an environment around the imaging device, an augmented reality evaluation of the environment around the imaging device, a communications link to a second device, or a map based evaluation of the imaging device.

21. At least one non-transitory machine readable medium comprising a plurality of instructions that in response to being executed on an imaging device, cause the imaging device to provide anti-glare exposures by:
   determining an autofocus distance to an object of interest;
   estimating a distance to a flash reflecting surface;
   determining the flash reflecting surface is between the imaging device and the object of interest based on a comparison of the autofocus distance and the distance to the flash reflecting surface; and
   disabling a flash of the imaging device during an exposure of the object of interest based on the determination the flash reflecting surface is between the imaging device and the object of interest.

22. The machine readable medium of claim 21 further comprising instructions that cause the computing device to provide anti-glare exposures by detecting the flash reflecting surface, wherein detecting the flash reflecting surface comprises:
   providing a pre-exposure flash; and
   comparing a first image frame from before the pre-exposure flash to a second image frame during the pre-exposure flash to determine a reflection of the pre-exposure flash in the second image.

23. The machine readable medium of claim 22, wherein estimating the distance to the flash reflecting surface comprises estimating the distance to the reflecting surface based on at least one of a size of the reflection or an intensity of the reflection.

24. The machine readable medium of claim 21 further comprising instructions that cause the computing device to provide anti-glare exposures by detecting the flash reflecting surface, wherein detecting the flash reflecting surface comprises:
   determining an environmental indicator associated with the imaging device, wherein the environmental indicator provides an indication of the environment in which the imaging device is currently located, and wherein estimating the distance to the flash reflecting surface is based on the environmental indicator.

25. The machine readable medium of claim 24, wherein the environmental indicator is based on at least one of an aural evaluation of an environment around the imaging device, an augmented reality evaluation of the environment around the imaging device, a communications link to a second device, or a map based evaluation of the imaging device.

* * * * *